Sept. 25, 1962  J. J. BLACK  3,055,710
DUMPING MECHANISM FOR VEHICLES
Filed June 20, 1960  8 Sheets-Sheet 1

INVENTOR.
James J. Black.
BY Wood, Herron & Evans,
ATTORNEYS.

Sept. 25, 1962   J. J. BLACK   3,055,710
DUMPING MECHANISM FOR VEHICLES
Filed June 20, 1960   8 Sheets-Sheet 4

INVENTOR.
James J. Black.
BY
Wood, Herron & Evans.
ATTORNEYS.

Sept. 25, 1962 J. J. BLACK 3,055,710
DUMPING MECHANISM FOR VEHICLES
Filed June 20, 1960 8 Sheets-Sheet 6

Fig. 11

INVENTOR.
James J. Black.
BY Wood, Herron & Evans.
ATTORNEYS.

Sept. 25, 1962     J. J. BLACK     3,055,710
DUMPING MECHANISM FOR VEHICLES
Filed June 20, 1960     8 Sheets-Sheet 8

INVENTOR.
James J. Black.
BY
Wood, Herron & Evans
ATTORNEYS.

3,055,710
DUMPING MECHANISM FOR VEHICLES
James J. Black, Cincinnati, Ohio, assignor to Trailmobile Inc., Cincinnati, Ohio, a corporation of Delaware
Filed June 20, 1960, Ser. No. 37,219
12 Claims. (Cl. 298—17.5)

This invention relates to semitrailers and other roadway vehicles and is directed particularly to an improved dump mechanism for vehicles of the type in which the rearward end is supported upon an undercarriage, such as a tandem spring suspension.

A semitrailer has been selected to illustrate the principles of the invention, the semitrailer being of the type wherein the dump body overhangs the tandem road wheels at opposite sides and is arranged to pivot about an axis located above the undercarriage at the rearward end of the vehicle. In a semitrailer of this character, the hoisting mechanism is mounted at the forward end of the body and arranged to lift the body to an inclined dumping angle so that the load slides by gravity from the rearward end of the body, which is normally closed by a tail gate or the like for confining the cargo during road transport.

Dump trailers of this type are used in transporting many different materials, for example, sand, gravel, plastic pellets, dry Portland cement and other dry pulverulent materials in bulk. Many of these materials are loaded into open dump bodies, while others, for example, Portland cement, are loaded into tank-type bodies which are arranged to be shifted to an inclined dumping angle. The various bulk materials have different characteristics, for example, one material may flow readily from the inclined dump body, while another material will cling to the body surfaces or have a steep angle of repose, making it necessary to tilt the body to a relatively steep dumping angle load to discharge the load. It is to be understood that the present invention is intended for the various types of dump bodies, including closed vessels or tanks, which are arranged to be unloaded from the rearward end by tilting the body to an inclined dumping angle. The designation "dump body," as used throughout the specification and claims, is therefore intended to include conventional open bodies and also closed vessels or tanks.

In a typical semitrailer having a tandem spring suspension, for which the present improvement is particularly intended, the pivot axis about which the dump body swings should be located at a point midway along the length of the leaf springs in order to provide the desired spring action during road transport. However, since the dump body overhangs the rear wheels at opposite sides, the maximum dumping angle, that is, the steepest angle at which the body may be tilted, is limited by the clearance between the rear wheels and body overhang. In other words, as the rearward portion of the body (that portion which extends rearwardly beyond the axis of rocking motion) moves downwardly toward the rear wheels, it will swing into engagement with the rearward tires if the body is tilted beyond the normal limit.

In one conventional type of semitrailer, the tandem suspension tilts rearwardly as the body approaches its maximum dumping angle, such that the forward wheels leave the ground while the body pivots about the rearward axle. However, this is not desirable in many instances because it concentrates the load on the rearward wheels, whereas lateral stability requires that both pairs of tandem wheels be maintained in ground contact. On the other hand, in order to provide an equivalent dumping angle without tilting the tandem suspension in a conventional vehicle of this type, it would be necessary to raise the axis of the pivot bearing; however, it is desirable to keep the body as low as possible to provide stability and to facilitate loading.

One of the primary objectives of the invention has been to provide an improved tandem suspension system for the dump body, whereby the maximum angle of inclination of the body or vessel in its dumping position, may be increased substantially beyond conventional practice, while maintaining both pairs of road wheels in ground contact, and without changing the plane of the body with respect to the wheels or disturbing the spring action of the tandem suspension during road transport.

According to this aspect of the invention, the dumping angle can be made sufficiently steep to provide efficient dumping action when handling materials which have a steep angle of repose or which are difficult to unload because of adherence of the material to the surfaces of the dump body.

On the other hand, the present improvement may be utilized to lower the height of the body relative to the running gear, if this is desired or necessary. In other words, the present improvement will permit the floor of the dump body to be mounted at a lower plane with reference to the running gear while maintaining at least the conventional maximum dumping angle. Thus, it may be of advantage to use this feature to lower the body in cases where the material to be handled does not require a steep maximum dumping angle.

Briefly, in order to provide the increased dumping angle, there is provided a compound pivot structure which shackles the body to the springs of the tandem suspension, such that the weight load is transmitted to the leaf springs at a primary load bearing point midway along the length of the springs to provide the proper spring action when the body is in its level position for road transport. The primary load bearing portion of the compound pivot structure is referred in this description as the "primary pivot" since it forms the primary pivot support of the body with reference to the springs. Spaced rearwardly from the primary pivot is another pivotal axis which is referred to herein as the "secondary pivot."

During the dumping operation, the body first begins to tilt about the primary pivot, such that the rearward portion of the body and the secondary pivot swings downwardly in an arc about the primary pivot until the secondary pivot reaches its limit of travel. Thereafter, during continued tilting of the body toward its maximum dumping angle, the body swings about the axis of the secondary pivot, which is located at a point rearwardly from the primary pivot. Since the axis of pivotal motion has now been shifted rearwardly toward the rear wheels of the tandem suspension, the overhanging side portions of the body rearwardly of the pivot axis are now provided with a greater amount of clearance with respect to the rear wheels; hence, by operation of the secondary pivot, the body may be shifted to a steeper than normal maximum dumping angle, with both pairs of tandem road wheels remaining in ground contact.

Another objective of the invention has been to provide a compound pivot structure which is torsionally rigid in directions transverse to its path of pivotal motion, and which is therefore capable of resisting the transverse forces which may act upon the heavily loaded body while it is being shifted upwardly to its inclined dumping position, and which is also capable of supporting the body securely with reference to the running gear when in the lowered road transport position.

Briefly, the compound pivot structure comprises bearing brackets carried by the springs at a mid-point between the axles with a torsionally rigid shackle member pivotally mounted between the brackets above the springs, this point of pivotal connection constituting the primary pivot. A saddle member is pivotally mounted at the outer or swinging end of the shackle at opposite sides, this point of connection constituting the secondary pivot. The swinging saddles extend back toward and above the primary pivot, the dump body being mounted upon the top of the saddles for pivotal motion.

In the level position of the body, the swinging end portion of the saddles rests directly upon the top of the bearing brackets (primary pivot), such that the weight load of the dump body is transmitted through the bearing brackets to the mid-portion of the springs for normal spring action. During the first stage of dumping motion, the pivotal portion of the saddle at opposite sides (secondary pivot) moves downwardly into bearing engagement with the springs, thus transferring the turning axis and load axis from the primary pivot to the secondary pivot to create the increased dumping angle. The combination of the rigid shackle, bearing brackets and swinging saddle is capable of resisting heavy forces which act upon the dump body in directions transverse to its path of pivotal motion, thereby to prevent any sidewise tilting with the body relative to the tandem suspension, particularly when the body is shifted to its elevated dumping position.

A further objective has been to provide a hoist mechanism which coacts with the compound pivot structure, and which adapts the trailer to move forwardly during the dumping stroke, thereby to distribute the load along the ground in an automatic manner to facilitate unloading of the cargo.

In order to bring about this action, the hoist mechanism includes a pair of coupling levers at opposite sides having forward ends pivotally connected to the draft vehicle or tractor and having rearward ends connected to the dump body at a point intermediate its length. Hoisting motion is developed by an actuating cylinder having its lower end connected to the forward portions of the coupling levers and having its upper end connected to the forward end of the dump body so as to force the forward end of the body upwardly during the dumping stroke.

In order to bring about the forward motion of the body, the tractor brakes are set and the trailer brakes are released; as the body shifts upwardly, the coupling levers swing upwardly in an arc and thus pull the body forwardly relative to the tractor so as to provide a progressive spreading action as the load is dumped. If such action is not desired, then the trailer brakes may be set and the tractor brakes released, causing the tractor to be pulled rearwardly while the trailer remains stationary with reference to the ground as the load is dumped.

The various features and advantages of the invention will be more clearly apparent to those skilled in the art from the following detailed description taken in conjunction with the drawings.

General Arrangement

Figures 1, 2, 3:
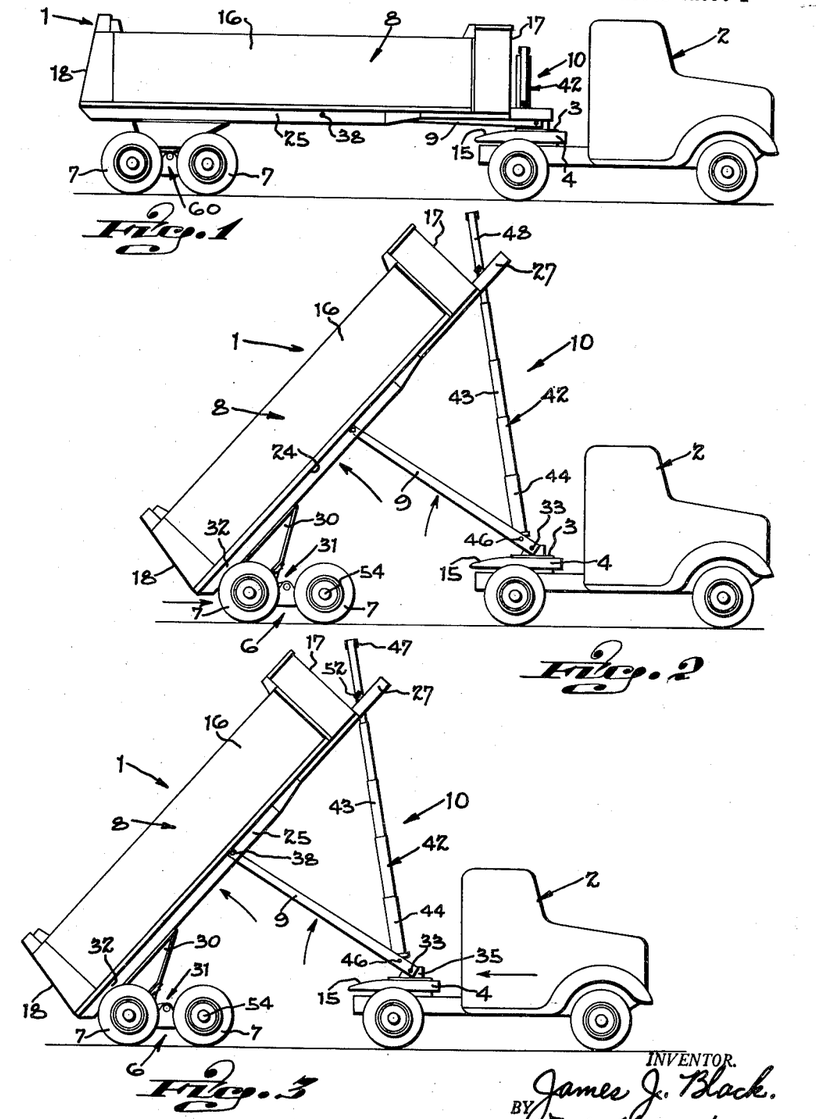
FIGURE 1 is a general side view showing a dump trailer incorporating the principles of the present invention.
FIGURE 2 is a view similar to FIGURE 1, showing the body of the vehicle shifted to its inclined dumping position. This view illustrates the action of the trailer when the trailer brakes are released and the brakes of the tractor are set during the dumping motion, causing the trailer to move forwardly so as to spread the load upon the ground in an automatic manner.
FIGURE 3 is a view similar to FIGURE 2 but showing the rearward motion of the tractor with the trailer brakes set and the tractor brakes released during the dumping operation.

Referring to FIGURE 1, a dump trailer constructed according to the principles of the invention, is indicated generally at 1 and is shown in coupled relationship with a roadway tractor indicated generally at 2. The forward end of the dump trailer, which is in the form of a semitrailer, is provided with an upper fifth wheel 3 resting upon the lower fifth wheel 4 of the tractor, the fifth wheel being of conventional design provided with a king pin 5 (FIGURE 5) which provides an articulated draft connection between the tractor and trailer. The rearward portion of the dump trailer is carried upon a tandem spring suspension or undercarriage, generally indicated at 6, having road wheels 7—7.

As best shown in FIGURES 2 and 3, the trailer body, indicated generally at 8, is of the well known open type; however, as noted earlier, the present improvement is also intended for use with tank trailers, in which the cargo is confined in a closed vessel or tank which is arranged for dumping. The body is pivotally joined to the fifth wheel 3 by a pair of articulated coupling levers 9—9 residing in opposite sides of the body and forming a part of the hoist mechanism, which is indicated generally at 10. The upper portion of the hoist mechanism is pivotally connected to the forward portion of the body for raising or lowering the body, as explained later.

Figure 5:
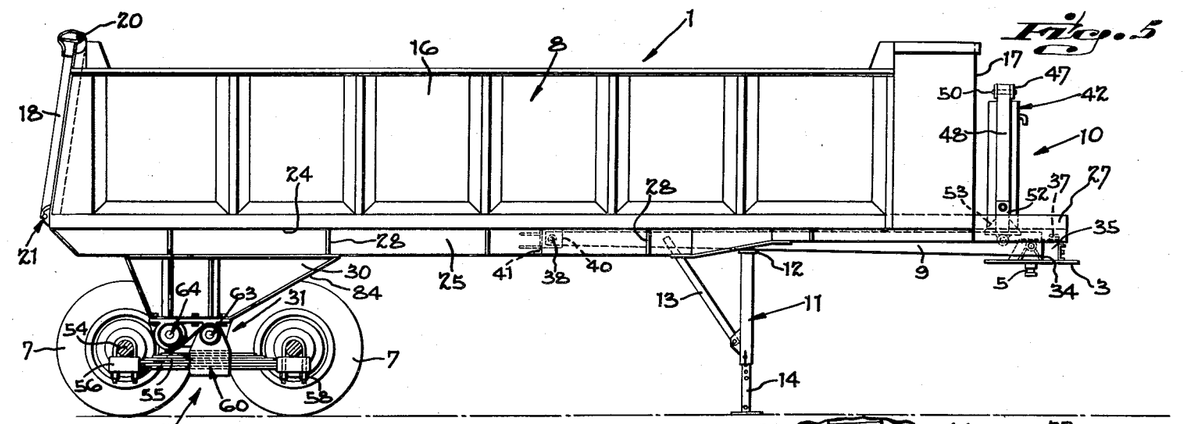
FIGURE 5 is a side elevation of the dump trailer with the wheels removed to further illustrate the compound pivot structure, the trailer being uncoupled from the tractor and resting upon its prop or landing gear.

Referring to FIGURE 5, the semitrailer is provided with a landing gear or prop, indicated generally at 11, for supporting the vevhicle when it is uncoupled from the tractor. The landing gear, which is conventional, comprises respective tubular legs joined as at 12 to the coupling levers 9 at opposite side and suitably braced as at 13. The lower portion of each tubular leg includes an extensible section 14 which may be adjusted to a retracted position (FIGURE 6) to provide road clearance when the semitrailer is coupled to the tractor. In order to couple the semitrailer conveniently, the tractor fifth wheel includes an upwardly inclined skid surface 15 (FIGURE 2) which slides under the trailer fifth wheel, thus lifting the weight load from the landing gear and adapting the extensible sections of the landing gear to be shifted to the retracted position for roadway transport.

As best shown in FIGURE 5, the body 8 of the semi-trailer is provided with side walls 16—16 suitably braced with vertical ribs, the side walls being joined to a front wall 17 adjacent the hoist 10. The rearward end of the body includes a tail gate 18, which is pivotally connected as at 20 to a bracket structure rising above the side walls. The lower edge of the tail gate includes a latch mechanism 21 for holding the tail gate normally in its closed position. As indicated in broken lines (FIGURE 6) the tail gate is free to swing vertically during the dumping operation with the latch mechanism disengaged to permit discharge of the cargo from the rearward end of the body. As viewed in FIGURE 4, the latch mechanism 21 may include a cable or rod 22 pivotally connected to a lever 23, which in turn is in operative connection with the latch mechanism for shifting it to a release position. The rod 22 extends forwardly to an actuating lever (not shown) which is accessible to the driver, so that the tail gate may be released for dumping without leaving the tractor. Since the latch mechanism is conventional and well known in the art, the structural details have been omitted.

Figure 4:
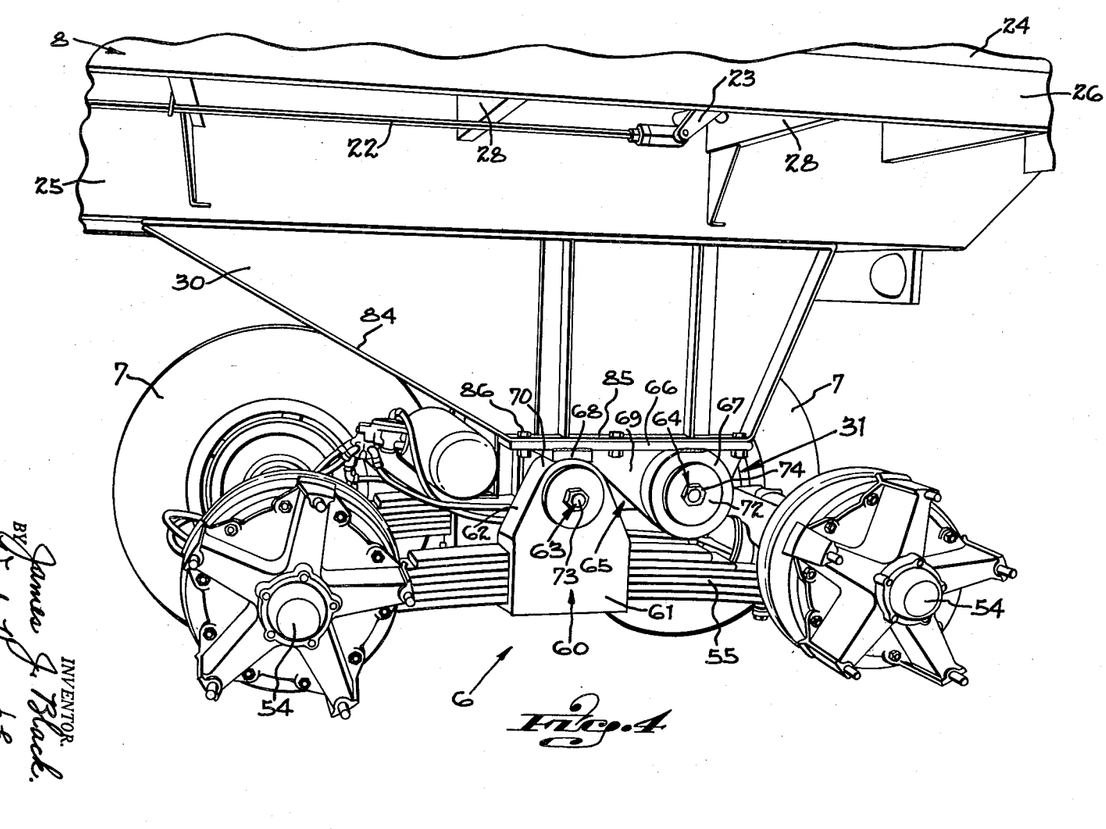
FIGURE 4 is an enlarged fragmentary perspective view of the tandem suspension, as viewed from the side of the trailer opposite to that shown in FIGURES 1–3, with the wheels removed, showing the compound pivot suspension of the dump body.
Figures 6, 7:
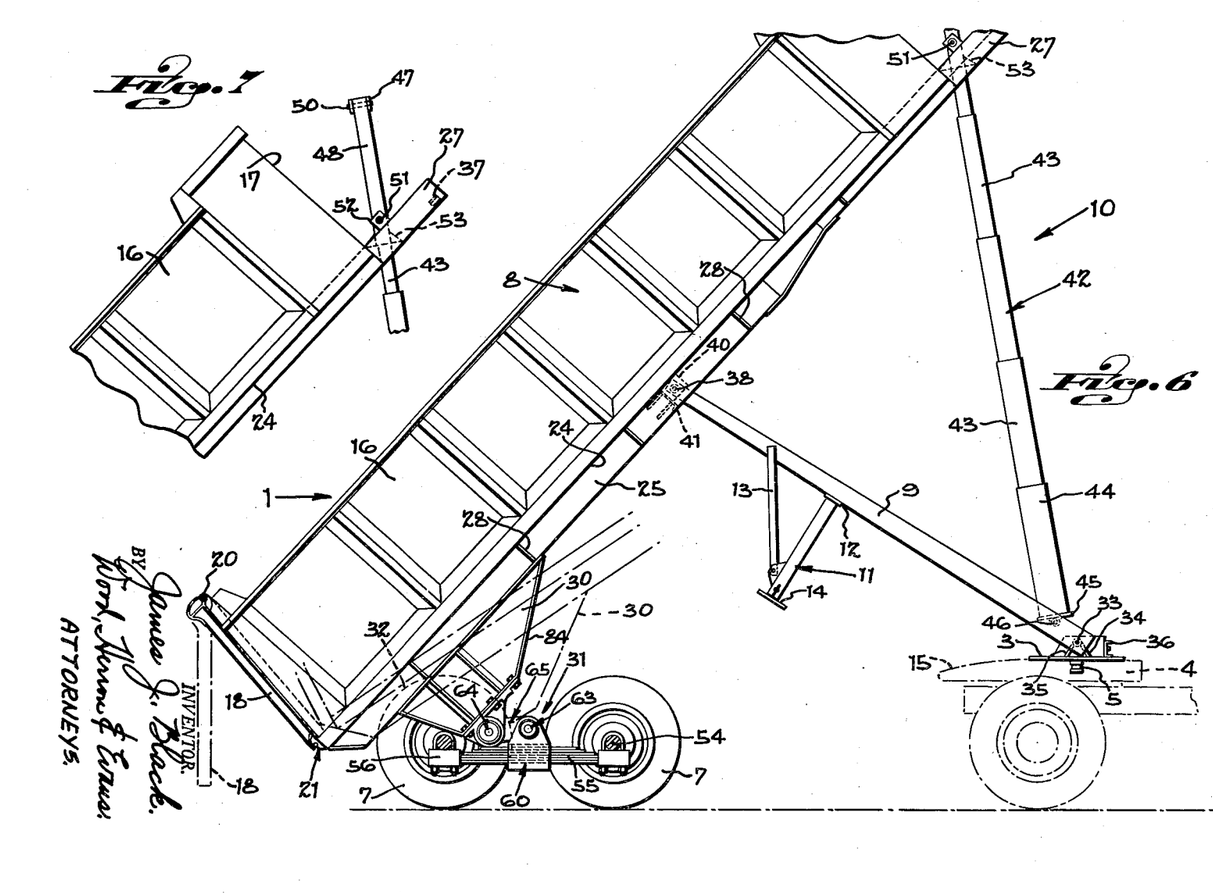
FIGURE 6 is a view similar to FIGURE 5, showing the dump trailer in its dumping position, with its fifth wheel resting on the mating fifth wheel of the tractor.
FIGURE 7 is a fragmentary side view showing the upper portion of the hoist mechanism which does not appear in FIGURE 6.

As viewed in FIGURES 4–6, the floor 24 of the body is supported by a pair of longitudinal side rails 25—25 and intermediate longitudinal rails 26 (FIGURE 4) extending for the full length of the body and extending outwardly beyond its forward end as at 27. A series of cross members 28 extend outwardly in cantilever fashion from the main side rails 25. The main side rails 25 are supported relative to the tandem suspension 6 by a pair of reinforced load bearing plates 30—30 (FIGURE 4) which reside in the plane of the side rails 25 and between the tandem road wheels 7. As viewed in FIGURE 4, the lower edges of the load bearing plates 30 are supported at opposite sides relative to the tandem suspension 6 by the compound pivot structure, which is indicated generally at 31 as described later in detail. It will be understood that the floor 24 on opposite sides extends outwardly in overhanging relationship with the road wheels. The compound pivot structure, as explained later, adapts the body to be shifted to a steeply inclined dumping angle without interference with the tires of the road wheels, a tire clearance indicated at 32 (FIGURES 2 and 3) being maintained at this critical point at the maximum dumping angle.

*Hoist Mechanism*

As best shown in FIGURES 5–8, the coupling levers 9—9 are pivotally connected as at 33 to the fifth wheel 3, the fifth wheel being provided with bearing brackets 34—34 at opposite sides from which the pivots 33 project. In addition, the fifth wheel is provivded with a pair of upright support plates 35—35 which are suitably braced by a channel member 36 welded across the forward edges of the plates 35. The forwardly projecting portion of the side rail structure 25, as previously indicated at 27, is provided with angle brackets 37—37 which are arranged to engage the upper edges of the support plates 35 and thus support the forward end of the body 8 in its lowered position, as shown in FIGURE 5.

The rearward ends of the coupling levers 9 are pivotally connected as at 38 to the side rails 25 at opposite sides. The pivot bearings 38 are carried by brackets 40, which in turn are attached to a cross member 41 extending between the side rails 25. In the lowered posiiton of the body (FIGURE 5) the forward portion of the body rests upon the upper edges of the couplnig levers 9, the levers thus providing a draft connection between the fifth wheel and dump body.

Power for elevating the body to its inclined dumping position is generated by a telescopic hoist cylinder 42, which comprises a series of cylindrical sections 43 slidably interfitted one within the other and provided with suitable hydraulic seals. Since the structure of the cylinder is conventional, the details have been omitted. Hydraulic fluid under pressure is supplied to and exhausted from the base section 44 of the hydraulic hoist by way of a conduit (not shown) which is in communication with a hydraulic system carried by the tractor and under the control of the driver.

The lower end of the base cylinder 44 includes a closure plate 45 (FIGURE 8) which is pivovtally connected as at 46 to the coupling levers 9 rearwardly of the pivot bearings 33. The upper end of the hydraulic cylinder (FIGURE 7) is provided with a cross member 47 extending outwardly from opposite sides of the upper cylinder section 43, and a pair of links 48—48 have their upper ends pivotally connected as at 50 to the outer ends of the cross member 47, such that the links straddle the cylinder. The lower ends of the links 48 are pivotally connected as at 51 to respective brackets 52 which are attached to the forward extension 27 of the side rails at opposite sides. A pair of feet 53 (FIGURE 8) are mounted on the forward portion of the side rails adjacent the brackets 52 and reside on opposite sides of the base cylinder 44; the feet are arranged to engage the upper surface of the closure plate 45 in the lower position of the body (FIGURE 5) and thus aid in supporting the body relative to the fifth wheel.

Figure 8:
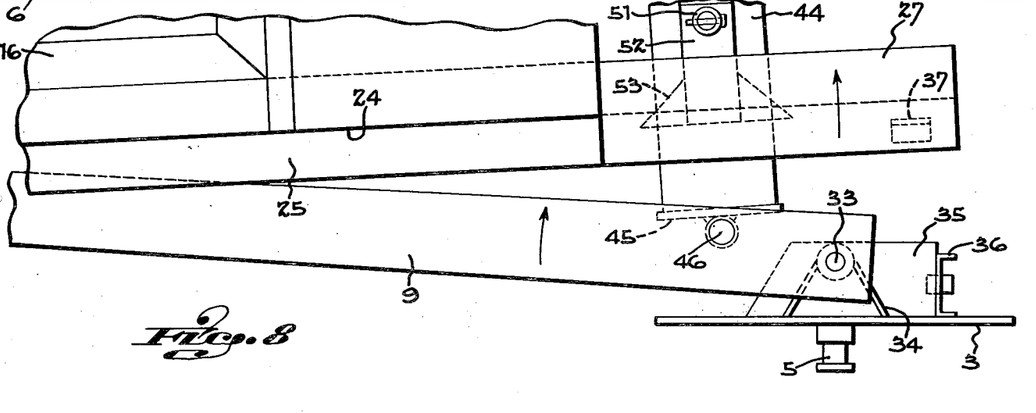
FIGURE 8 is an enlarged fragmentary side view of the forward portion of the trailer, showing the action of the hoisting mechanism at the start of the dumping stroke.

When hydraulic pressure is supplied to the base cylinder 44 to shift the body to its inclined dumping position, a spreading force is applied between the forward portion 27 of the body and coupling levers 9 through operation of the links 48, thus developing a scissors action, as indicated by the arrows in FIGURE 8. Since the pivot point 46 of the hoist cylinder is located rearwardly of the pivot point 33 of the coupling levers, the stroke of the hoist cylinder is increased slightly through triangulation. When the maximum dumping angle is reached (FIGURE 6) the hoist cylinder and coupling levers are angularly related to the body, the hoist cylinder being free to rock about its pivot point to accommodate for the tilting motion of the dump body. The pivot point 38 of the levers 9 swings upwardly through an arc as indicated by the arrow in FIGURE 6 as the body 8 is shifted to its upwardly inclined dumping position, thus developing relative motion between the tractor and trailer as noted earlier. Thus, as explained previously, the trailer may be caused to move forwardly to spread the load along the ground during the dumping operation if the tractor brakes are set and the trailer brakes released when the body is being shifted to its inclined dumping angle.

Since the coupling levers 9 are pivoted at opposite sides of the body frame and fifth wheel, while the hoist cylinder 42 is centered between the levers, the hoisting apparatus provides substantially a three point support for the dump body in its inclined dumping position. As explained later in detail, the compound pivot structure 31 resists twisting forces acting upon the body and coacts with the hoist mechanism to support the vehicle in a stabilized state when inclined to its dumping angle.

*Compound Pivot Structure*

Referring to FIGURES 9–12, the tandem suspension, previously indicated at 6 includes a par of tandem axles 54—54, the dump body being suspended relative to the axles by a pair of leaf springs 55—55 having opposite ends connected to the axles. The opposite ends of each spring are confined in shackle members 56—56 attached to the axles 54 by means of U-bolts 57—57 which embrace the upper portion of the axles. The lower portions of the U-bolts pass through the shackle members and include nuts 58 which clamp the shackles to the axles.

Figures 9, 10:
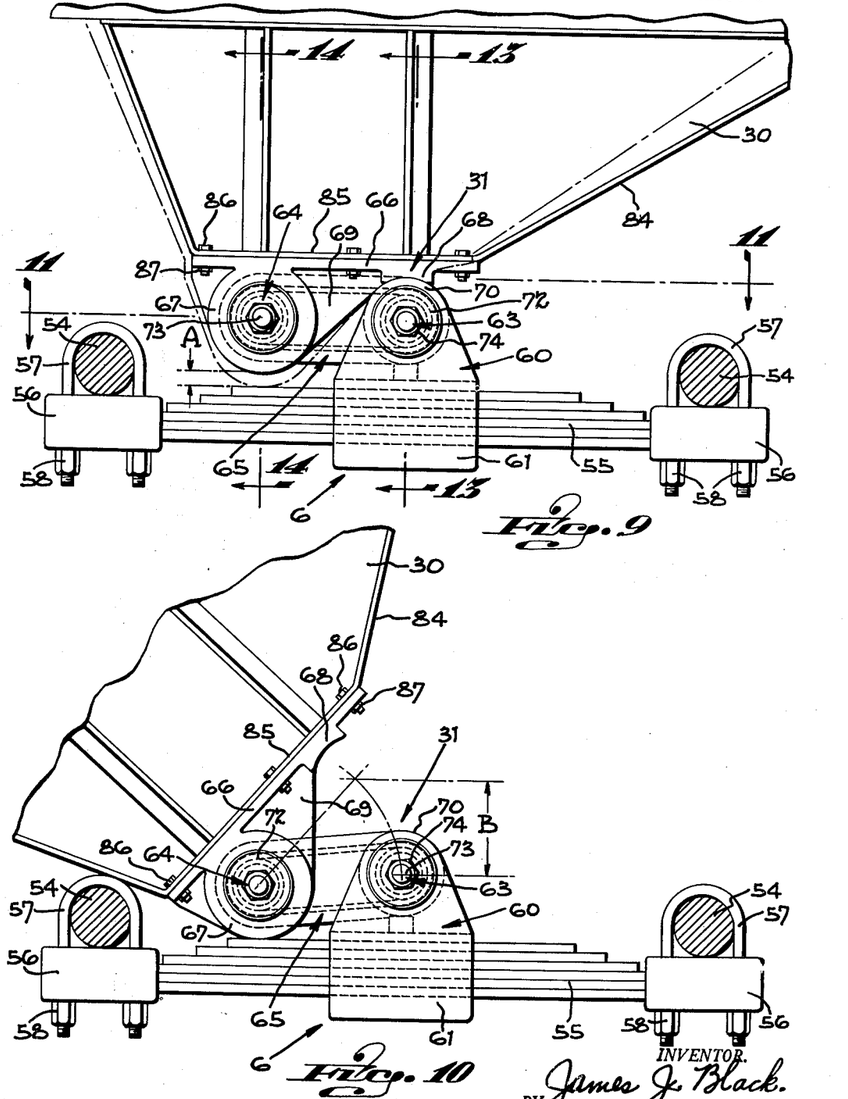
FIGURE 9 is a fragmentary sectional view detailing the compound pivot mounting structure, with the body in its normal lowered position.
FIGURE 10 is a view similar to FIGURE 9, showing the relationship of the parts when the body is tilted to its maximum dumping angle.
Figure 11:
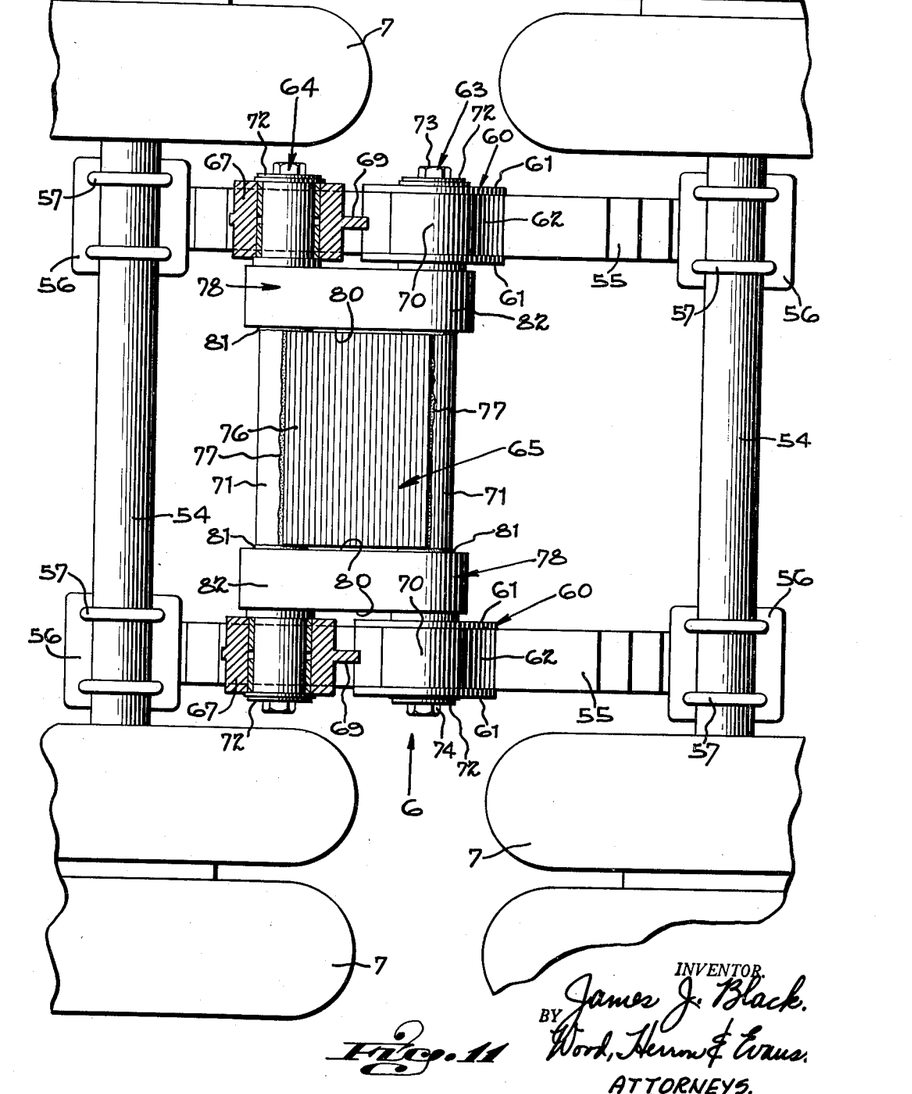
FIGURE 11 is a sectional view taken along line 11—11 of FIGURE 9, detailing the compound pivot structure as viewed from above.

The compound pivot structure 31 is mounted upon the leaf springs by a pair of bearing brackets 60—60 which are located at a central point along the springs between the axles. Each bearing bracket 60 comprises a generally U-shaped clip 61 (FIGURE 12) embracing the lower surface of the spring, with a block 62 interposed between the limbs of the clip and seated against the upper surface of the spring. The bearing brackets 60 support the primary pivot, indicated generally at 63, which transmits the weight load of the dump body to the springs when the body is in its lowered position (FIGURE 9). It will be seen in this view that the weight load of the body is transmitted to the springs at a mid-point along their length to provide normal spring action during road transport.

Figure 12:
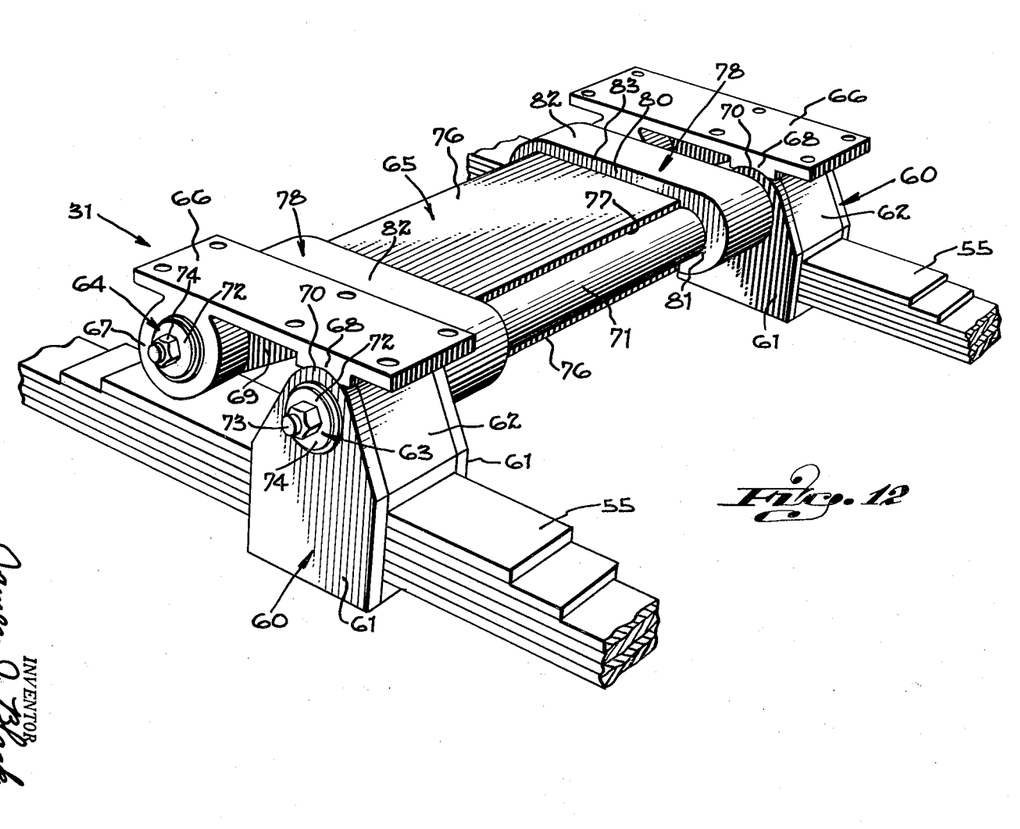
FIGURE 12 is a fragmentary perspective view further detailing the compound pivot structure or suspension.

The secondary pivot, which is indicated generally at 64, supports the weight load of the body during its dumping motion and thereby shifts the axis of pivotal motion and the load axis rearwardly from the primary pivot so as to provide wheel clearance suitable to increase the dumping angle. The secondary pivot 64 is pivotally connected to the primary pivot 63 by means of a rocking shackle, indicated generally at 65 (FIGURE 12). The dump body is supported upon the primary and secondary pivots by a pair of saddle plates 66—66, which swing relative to the shackle 65, each saddle member having a bearing boss 67 pivotally connected to the secondary pivot 64, the free end of each saddle member or plate having an arcuate load bearing pad 68. The saddle plate includes a rib 69 extending from the boss 67 to the load bearing pad 68.

In the level position of the dump body (FIGURE 9) the load bearing pad 68 rests upon the rounded upper portion 70 of the bearing brackets 60 at opposite sides, thus transmitting the weight load of the body to the central portion of the leaf springs. In the dumping position of the body, the saddle plates 66 swing downwardly with the shackle 65 until the bearing bosses 67 of the saddle plates at opposite sides rest upon the top surface of the leaf springs (FIGURE 10) thus shifting the axis of pivotal motion (and the load axis) rearwardly from the primary pivot 63 to the secondary pivot 64.

Figure 13:
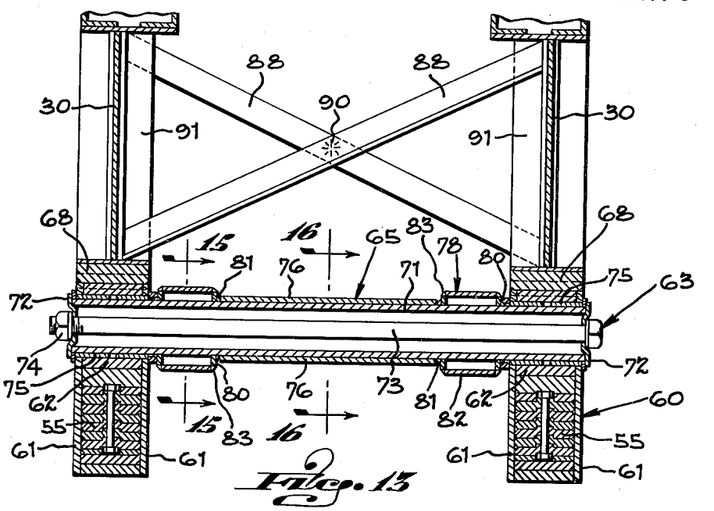
FIGURE 13 is a sectional view taken along line 13—13 of FIGURE 9, detailing the primary pivot connection between the springs and body of the vehicle.

Described in detail with reference to FIGURE 13, the primary pivot 63 comprises a tube 71 having opposite endwise portions journalled for rocking motion in the bearing blocks 62, the tube being locked against axial motion by a pair of washers 72—72 seated against opposite ends of the tube and engaging the blocks 62. A bolt 73 passes through the tube and includes a nut 74 at one end, the arrangement being such that the washers lock the assembly against endwise displacement with respect to the bearing blocks 62.

Figure 14:
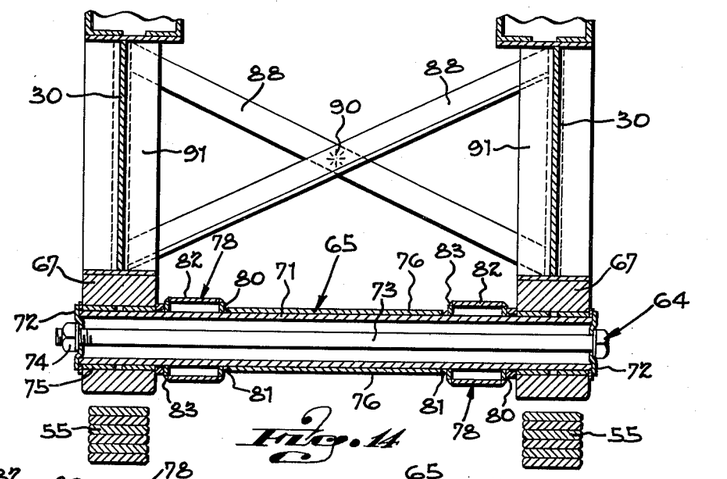
FIGURE 14 is a sectional view taken along line 14—14 of FIGURE 9, detailing the secondary pivotal connection.

The secondary pivot 64 (FIGURE 14) likewise comprises a tube 71 having opposite ends journalled for rocking motion in the bearing bosses 67 of the saddle plates. The tube 71 is also held against endwise displacement by washers 72 traversed by a bolt 73 having a nut 74, as noted above. Both the primary and secondary pivot tubes include respective bushings 75 presenting a bearing surface of the tubes, which pivot relative to the bearing elements.

Figure 15:
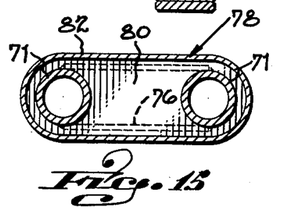
FIGURE 15 is a cross sectional view taken along line 15—15 of FIGURE 13, showing the reinforcing portion of the torsionally rigid shackle between the primary and secondary pivots.
Figure 16:
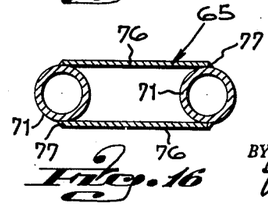
FIGURE 16 is a cross section taken along line 16—16 of FIGURE 13, detailing the torsionally rigid connector or body shackle.

As best shown in FIGURES 12 and 16, the tubes 71—71 of the primary and secondary bearings are connected together in spaced parallel relationship by means of rocking shackle 65, which comprises spacer plates 76—76 embracing the opposite sides of the tubes and welded thereto as at 77 (FIGURE 16). In order to further strengthen the shackle 65, there is provided a pair of hollow reinforcement housings 78—78 (FIGURES 12 and 15) spanning the primary and secondary pivot tubes 71—71. Each housing is generally oval-shaped comprising side wall plates 80—80 which are welded as at 81 to the periphery of the tubes 71—71. A cover plate 82 extends about the side wall plates, being welded as at 83 to the outer edges of the side wall plates to form a boxlike structure capable of resisting the twisting forces which are imposed upon the shackled structure, particularly when the body is in its dumping position.

It will be understood at this point that the compound pivot structure is acted upon by heavy load forces both when the body is in its lowered position and in its upwardly inclined dumping position, since the entire weight load of the rearward portion of the body is concentrated upon the pivot structure. By way of example, in addition to the direct load forces which are transmitted through the pivot structure to the springs, there are also twisting forces acting in a generally transverse plane, tending to change the parallel relationship of the primary and secondary pivot tubes 81. Such forces are developed, for example, if the ground is not level at the unloading site, such that the loaded body tends to lean one way or the other as it is tilted toward its dumping angle; however, the saddle structure, which is torsionally rigid, is capable of resisting such forces without undue strain.

As best shown in FIGURES 9 and 10, the load bearing side plates 30 of the body are each provided with a reinforcing flange 84 having a horizontal portion 85 which rests upon the saddle plate 66 at opposite sides of the vehicle, the flange being attached to the saddle plate by the bolts 86. The bolts pass through the flange and saddle plate and include nuts 87 residing beneath the saddle plate. In order to reinforce the load bearing plates 30 against forces which are transmitted to them by the loaded body during road transport and during the dumping stroke, they are provided with cross braces 88 (FIGURES 13 and 14) which are channel shaped in cross section. The cross section braces are welded as at 90 at their point of intersection and their outer ends are welded to the vertical reinforcing ribs 91 of the load bearing plates 30.

In the level position of the body as noted earlier, the load is transmitted to the central portion of the springs from the load bearing pads 68 through the bearing brackets 60 of the primary pivot 63, the bearing bosses 67 of the secondary pivot 64 being spaced above the upper surface of the springs, as indicated at A in FIGURE 9. At the start of the dumping operation, the body rocks about the axis of the primary pivot 63 until the bearing bosses 67 take up the clearance A and engage the top surface of the leaf springs, as indicated in broken lines (FIGURE 9).

The load bearing axis thus shifts rearwardly to the secondary pivot, and during continued motion in the dumping direction, the periphery of the bearing boss 67 rides in bearing engagement upon the top surface of the leaf spring 55 until the maximum dumping angle is reached, as indicated in FIGURE 10. At the maximum dumping angle, the axis of the bearing pad 68 which coincides with the axis of the primary pivot in the level position of the body, rises to the point indicated at B in FIGURE 10.

In order to demonstrate the operation of the compound pivot structure 31, a type of pivot mounting is shown in broken lines in FIGURE 6, in which the dump body is arranged to tilt about the axis of the primary pivot 63 to its maximum dumping angle. According to this example, when the body is inclined to the position indicated by the broken lines in FIGURE 6, the tires interfere with the overhanging portions of the floor 24 approximately at the angle indicated, thus limiting the dumping angle to substantially less than the angle provided by the compound pivot structure. It will be apparent therefore, that it would be possible to increase the dumping angle in the example illustrated by raising the axis of the pivot structure a greater distance above the spring suspension. However, this would raise the entire body and this is undesirable because there are definite advantages in most instances in having the body carried as low as possible. It would also be possible to increase the maximum angle by causing the tandem suspension to tilt with the body; however, as noted earlier, the present structure is intended to provide ground contact for both wheels of the tandem suspension when the body is tilted to the dumping position for proper weight distribution and stability.

Briefly therefore, the compound pivot structure has the advantage of maintaining the body at a low level and of providing additional tire clearance without tilting the tandem suspension by shifting the axis of tilting motion from the primary to the secondary pivot during the tilting movement of the body. The secondary axis (bearing boss 67) bears upon the springs at opposite sides only during the dumping motion, the load being transferred back to the primary pivot when the body is lowered so as to provide the proper spring action during road transport.

It will be understood that the dumping angle can be further increased by lengthening the swinging body shackle of the compound pivot structure, so as to bring the secondary pivot axis closer to the rearward axle of the tandem suspension. However the present arrangement, which provides a dumping angle in the neighborhood of 55 degrees from the horizontal, has been found satisfactory for dumping most materials which are handled with this type of equipment.

As noted earlier, the compound pivot structure can also be used to lower the floor of the dump body with reference to the tandem suspension system, if such lowering may be of advantage in any particular case. For this purpose, the height of the load bearing side plates 30 may be decreased so as to bring the floor and side walls to a lower level. This change will naturally decrease the maximum permissible dumping angle for a given shackle; therefore, in such cases, it may be necessary to increase the length of the shackle to obtain the desired dumping angle.

Having described my invention, I claim:

1. A dump trailer adapted to be coupled to a towing vehicle comprising, a dump body adapted to be shifted to a rearwardly inclined dumping angle and to discharge the load from the rearward end thereof, an undercarriage having road wheels, compound pivot means connecting the rearward portion of the dump body to said undercarriage, said compound pivot means having a primary pivot and a secondary pivot located rearwardly of the primary pivot, a rocking shackle connecting said pivots to one another, said compound pivot means adapted to transmit the weight load of the body to the undercarriage through said primary pivot when the body is in a level position, said rocking shackle adapted to swing downwardly and to bring the secondary pivot into supporting engagement relative to the undercarriage, thereby to shift the weight load rearwardly through said secondary pivot to the undercarriage during the dumping motion of the body, a fifth wheel mounted at the forward portion of the body, a pair of levers pivotally connected to the fifth wheel at opposite sides thereof, said levers having rearward portions pivotally connected to the body at an intermediate point between the fifth wheel and undercarriage, a hoist interconnecting the fifth wheel and levers, said hoist adapted to provide a spreading action between the forward portion of the body and levers, thereby to pivot said body upwardly relative to the compound pivot means to said inclined dumping angle, said levers adapted to move the body forwardly toward the towing vehicle during the dumping motion of the body, thereby to distribute the load as it is discharged from the rearward end of the body, said compound pivot means adapted to increase the clearance between the road wheels and the dumping angle and thereby to increase the motion of the dump body toward the towing vehicle.

2. A dump vehicle comprising, a dump body, a tandem spring suspension having forward and rearward pairs of road wheels, a pair of spring elements extending longitudinally between said road wheels at opposite sides of the spring suspension, a compound pivot structure pivotally connecting the rearward portion of said dump body to said tandem spring suspension with the opposite sides of the body overhanging the road wheels, said compound pivot structure having a primary pivot connected to said spring elements at a point intermediate the length thereof, said primary pivot providing a load axis adapted to support the dump body relative to the spring suspension when the body is in a level position, said compound pivot structure having a secondary pivot element spaced rearwardly from the primary pivot, swinging means connecting the secondary pivot element to the primary pivot, said compound pivot structure adapted to swing downwardly and to bring the secondary pivot into supporting engagement relative the spring elements during the dumping motion of the body, thereby to shift the weight load rearwardly to the secondary pivot element during the dumping motion of said body and to impose the said load of the body upon the spring elements along an axis located rearwardly from the primary pivot, support means for the forward end of said body, a hoist mechanism mounted on said support means and connected to the forward portion of the dump body, said hoist mechanism adapted to tilt said body upwardly to a rearwardly inclined dumping angle, said secondary pivot element adapted to increase the clearance between the rearward wheels and overhanging portions of the body, thereby to increase the maximum dumping angle of the body.

3. A dump trailer adapted to be coupled to a towing vehicle comprising a dump body adapted to be shifted to a rearwardly inclined dumping angle, a tandem spring suspension having forward and rearward pairs of road wheels, a compound pivot structure pivotally connecting the rearward portion of said dump body to said tandem spring suspension with the opposite sides of the body overhanging the road wheels, said compound pivot structure having a primary pivot providing a load axis connecting said dump body to said spring suspension and adapted to support the dump body relative to the spring suspension when the body is in a normal position, said compound pivot structure having a secondary pivot spaced rearwardly from the primary pivot and adapted to provide a second load axis, swinging means connecting the secondary pivot to the primary pivot, said compound pivot structure adapted to shift the weight load of the body rearwardly toward the secondary pivot during the dumping motion of said body toward said rearwardly inclined dumping angle, said swinging means adapted to pivot downwardly during the dumping motion of the body and to bring the secondary pivot into supporting engagement relative to the tandem spring suspension, thereby to impose the weight load of the body upon the spring suspension along an axis located rearwardly from the primary pivot, a fifth wheel at the forward end of said body, hoist means interconnecting the fifth wheel and forward portions of said body and adapted to tilt the body upwardly to said rearwardly inclined dumping angle, said hoist means adapted to move the body forwardly toward the towing vehicle during the dumping motion of the body, thereby to distribute the load as it is discharged from the rearward end of the body, said secondary pivot element adapted to increase the clearance between the rearward wheels and overhanging portions of the body, thereby to increase the maximum dumping angle and forward motion of the body.

4. A dump vehicle comprising, a tandem suspension including springs at opposite sides, shackle means, primary pivot means connecting one end of the shackle means to said springs at opposite sides, said shackle means extending toward the rearward end of said tandem suspension, saddle means at opposite sides of said tandem suspension, secondary pivot means connecting the saddle means to the free end of said shackle means, said saddle means residing above the shackle means and extending toward said primary pivot means, and a dump body mounted on said saddle means, said shackle means being spaced above the springs of the tandem suspension when said body is in a level position, whereby the weight load of the body is transmitted to said springs through said primary pivot means, said shackle means adapted to pivot about the primary pivot means during the dumping motion of the body and to shift said saddle means downwardly into contact with said springs, said saddle means adapted to pivot about said secondary pivot means during motion of the body toward the maximum dumping angle thereof.

5. A dump vehicle comprising, a tandem suspension including forward and rearward road wheels and having springs at opposite sides, bracket means mounted on said springs at opposite sides, primary pivot means, shackle means having an end connected to each of said bracket means at opposite sides by said primary pivot means, said shackle means having a free end extending toward the rearward end of said tandem suspension, saddle means at opposite sides of said tandem suspension, secondary pivot means connecting said saddle means to the free rearward ends of said shackle means, said saddle means residing above the shackle means and extending toward said primary pivot means, and a dump body mounted on said saddle means and having portions overhanging said road wheels at opposite sides, said shackle means being spaced above said springs when said body is in a normal position, whereby the weight load of the body is transmitted to said springs through said primary pivot means, said shackle means adapted to pivot about the axis of the primary pivot means during the dumping motion of the body to a rearwardly inclined position, whereby said saddle means shift downwardly into contact with said springs, said saddle means adapted to pivot about said secondary pivot means during motion of the body toward the maximum dumping angle thereof, thereby providing clearance between said rearward wheels and the overhanging portions of the body.

6. A suspension system for a vehicle having a dump body adapted to be tilted rearwardly to an inclined dumping angle, said suspension system comprising, an undercarriage having respective springs at opposite sides thereof, shackle means, primary pivot means connecting said shackle means to the springs at opposite sides, said shackle means having a free end extending toward the rearward end of the undercarriage, saddle means, and secondary pivot means connecting said saddle means to the free end portion of said shackle means, said saddle means adapted to pivotally support a dump body, said shackle means adapted to reside in a plane spaced above the springs when said body is in a level position with the weight load thereof transmitted to the springs by said primary pivot means, said shackle means and saddle means adapted to pivot about said primary pivot means as said body is tilted toward a rearwardly inclined dumping angle, said secondary pivot means adapted to transmit said weight load to said springs during the rearward dumping motion of the body, whereby said body pivots to its dumping angle about said secondary pivot means.

7. A suspension system for a vehicle having a dump body adapted to be tilted rearwardly to an inclined dumping angle, said suspension system comprising, an undercarriage having respective springs at opposite sides thereof, a bracket mounted upon each of said springs at an intermediate point relative to the length thereof, a swinging shackle, a primary pivot connecting an end of said shackle to the brackets at opposite sides of the vehicle, said shackle having a free end extending toward the rearward end of the undercarriage, a saddle and a secondary pivot connecting said saddle to the free rearward end of said shackle, said saddle adapted to pivotally support a dump body, said shackle adapted to reside in a plane spaced above the springs when said body is in a normal position with the weight load thereof transmitted to the springs by said primary pivot, said saddle and shackle adapted to pivot about said primary pivot as said body is tilted rearwardly toward said dumping position, said secondary pivot adapted to transmit said weight load to said springs during the rearward dumping motion of the body, whereby said body pivots to its dumping angle about said secondary pivot.

8. A suspension system for a vehicle having a dump body adapted to be tilted to a rearwardly inclined dumping angle, said suspension system comprising, an undercarriage having respective springs at opposite sides thereof, a bracket element mounted upon each of said springs, a torsionally rigid shackle element, a primary pivot shaft extending transversely across the undercarriage and connecting said shackle to the bracket elements at opposite sides of the vehicle, said shackle element having a free end extending toward the rearward end of the undercarriage, saddle means and a secondary pivot shaft extending transversely and connecting said saddle means to the free end of said shackle element, said saddle means adapted to pivotally support a dump body, said shackle element adapted to reside in a plane spaced above the springs when said body is in a level position with the weight load thereof transmitted to the springs by said primary pivot shaft, said saddle element and shackle element adapted to pivot about said primary pivot shaft as said body is tilted rearwardly toward an inclined dumping position, said secondary pivot shaft adapted to transfer said weight load to said springs during the rearward dumping motion of the body, whereby said body pivots to its dumping angle about said secondary pivot shaft, said torsionally rigid shackle element being adapted to resist forces acting transversely upon said upwardly inclined body.

9. A compound pivot structure for a vehicle having a tandem spring suspension including forward and rearward road wheels and having a dump body including portions overhanging the said road wheels at opposite sides, said compound pivot structure comprising, a bracket element mounted upon each of said springs at an intermediate point along the length thereof, a primary pivot shaft extending transversely of said tandem suspension and having opposite endwise portions journalled in said bracket elements, a torsionally rigid shackle member extending rearwardly from said primary pivot shaft and adapted to swing in a vertical plane, a secondary pivot shaft mounted on the free end of said shackle member and a pair of saddle elements pivotally mounted on said secondary pivot shaft at opposite sides of the tandem suspension, said saddle elements adapted to engage and support a dump body, said saddle elements each having bearing means adapted to reside in a plane above said springs at opposite sides when said dump body is in a normal position with the weight load of the body transmitted to the springs by the primary pivot shaft, said shackle member and bearing means adapted to swing about said primary pivot shaft during the dumping motion of the body, said bearing means adapted to engage said springs during said dumping motion, whereby the load axis is shifted rearwardly to increase the clearance between the wheels of the tandem suspension and the overhanging portions of the dump body, thereby to increase the maximum dumping angle of said body.

10. A compound pivot structure for a vehicle having a tandem spring suspension including forward and rearward road wheels and having a dump body, said dump body including portions overhanging the said road wheels at opposite sides, said compound pivot structure comprising, a primary pivot shaft extending transversely of said tandem suspension and having opposite endwise portions journalled relative to said springs intermediate the length thereof, a torsionally rigid shackle plate extending rearwardly from said primary pivot shaft between the springs, a secondary pivot shaft mounted on the free end of said shackle plate, and a pair of saddle elements disposed on opposite sides of the shackle plate and adapted to engage and support a dump body, said saddle elements each having a bearing boss rotatably journalled upon said secondary pivot shaft, said bearing boss adapted to reside in a plane above said springs at opposite sides when said dump body is in a level position with the weight load of the body transmitted to the springs by the primary pivot shaft, said shackle and bearing bosses adapted to swing about said primary pivot shaft during the dumping motion of the body, whereby said bearing bosses engage said springs during said dumping motion to shift the axis of dumping motion rearwardly to said secondary pivot shaft and to increase the clearance between the wheels of the tandem suspension and the overhanging portions of the dump body, thereby to increase the maximum dumping angle of said body.

11. In a tandem suspension for a dump body adapted to be tilted to an inclined dumping position, said suspension including springs at opposite sides, a primary pivot disposed between the body and springs for pivotally supporting the body upon the springs, said body adapted to be disengaged from the primary pivot upon tilting motion of the body to said inclined dumping position, a secondary pivot attached to the body and normally spaced from the springs, said secondary pivot adapted to support the body relative to the springs independently of said primary pivot upon tilting motion of the body, and a torsionally rigid member extending between said primary and secondary pivots and adapted to shackle the secondary pivot to the primary pivot.

12. In a tandem suspension for a dump body adapted to be tilted to an inclined dumping position, said suspension including springs at opposite sides, a primary pivot element disposed between the body and springs at opposite sides for pivotally supporting the body upon the springs, said body adapted to be disengaged from the primary pivot upon tilting motion of the body to said inclined dumping position, a secondary pivot attached to the body and normally spaced above the springs, said secondary pivot being engageable with the springs upon tilting motion of the body and adapted to support the body upon the springs independently of said primary pivot, and a torsionally rigid member extending between said primary and secondary pivots and adapted to shackle the secondary pivot to the primary pivot, said torsionally rigid member adapted to resist forces which act transversely relative to the dump body.

References Cited in the file of this patent

UNITED STATES PATENTS

| | | |
|---|---|---|
| 2,761,730 | Black | Sept. 4, 1956 |
| 2,794,673 | Harbers et al. | June 4, 1957 |
| 2,883,237 | Schonrock | Apr. 21, 1959 |